J. L. FATE.
AUTOMATIC VENTING AND SEALING DRAW-OFF FITTING.
APPLICATION FILED DEC. 7, 1908.
953,027.
Patented Mar. 29, 1910.
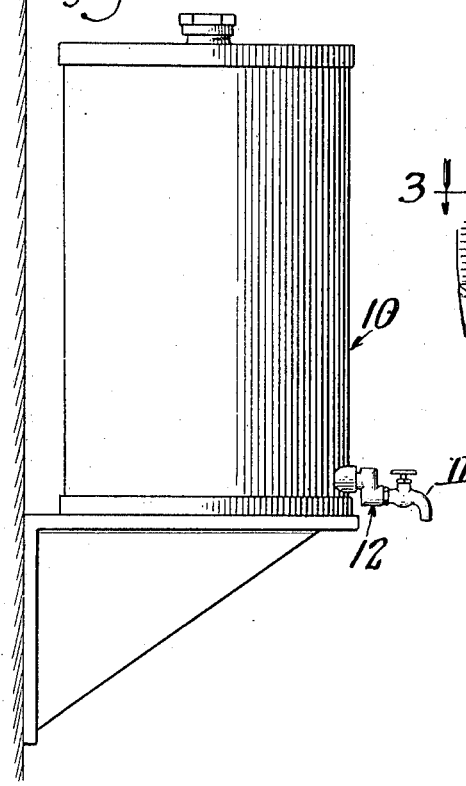
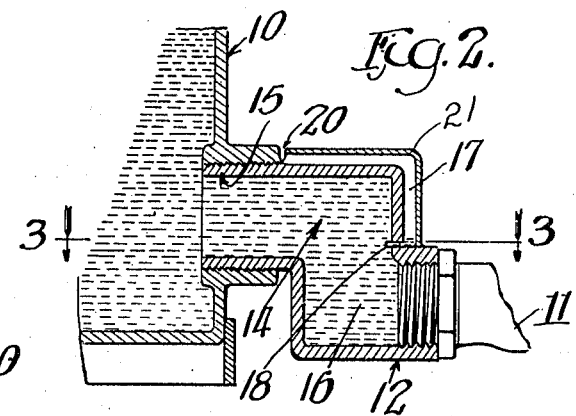
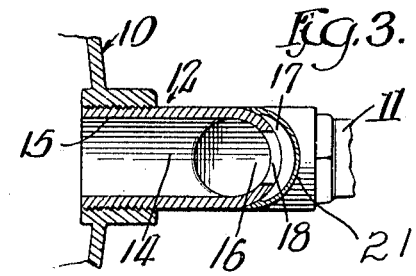
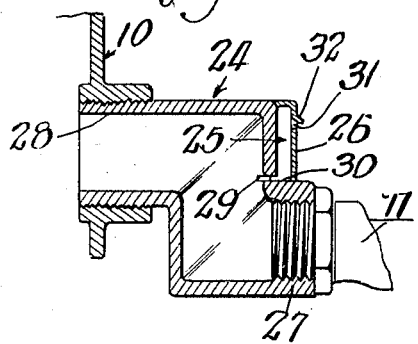
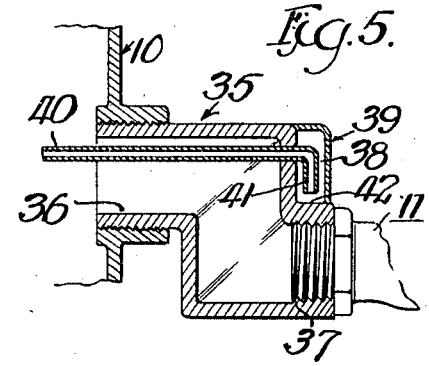
Witnesses:
F. H. Hyde
G. R. Wilkins
Inventor:
John L. Fate
by Poole & Brown
Attys

UNITED STATES PATENT OFFICE.

JOHN L. FATE, OF CHICAGO, ILLINOIS.

AUTOMATIC VENTING AND SEALING DRAW-OFF FITTING.

953,027.  Specification of Letters Patent.  Patented Mar. 29, 1910.

Application filed December 7, 1908. Serial No. 466,265.

*To all whom it may concern:*

Be it known that I, JOHN L. FATE, a citizen of the United States, and a resident of Chicago, in the county of Cook and State of Illinois, have invented certain new and useful Improvements in Automatic Venting and Sealing Draw-Off Fittings; and I do hereby declare that the following is a full, clear, and exact description thereof, reference being had to the accompanying drawings, and to the numerals of reference marked thereon, which form a part of this specification.

This invention relates to a novel device for drawing off liquid from closed or air tight receptacles and having means to automatically vent the receptacle during the outflow of liquid therefrom and arranged to automatically seal the venting means when the flow of liquid through the draw-off device is stopped.

My invention, which embraces an automatically venting and automatically sealing device, may be embodied in a coupling fitting adapted to constitute a connection between a draw-off faucet or cock and the receptacle from which liquid is to be drawn, or it may be embodied in and arranged to constitute a part of the draw-off faucet or cock itself.

The invention consists in the matters hereinafter set forth and more particularly pointed out in the appended claims.

In the drawings:—Figure 1 is a side elevation of a receptacle equipped with a draw-off fitting embodying my invention. Fig. 2 is a vertical section taken through the part of the device in which is embodied the self venting and sealing features of the device. Fig. 3 is a detail section taken on line 3—3 of Fig. 2. Fig. 4 is a section similar to Fig. 2, showing a modification. Fig. 5 is a similar section showing a further modification.

As shown in the drawings, 10 designates a receptacle for liquid which is normally air tight except at the point of withdrawal of the liquid therefrom, at which point air is admitted as the liquid is withdrawn.

11 designates a faucet or draw-off cock connected with the tank through the medium of a fitting 12, which, as herein shown, is made separate from the faucet and constitutes a coupling or connection between the faucet and receptacle. Said faucet or cock may be of any suitable or preferred construction.

The fitting 12 may be made an integral part of the faucet or may be made a part separate therefrom and connected therewith by the screw-threaded connection herein shown. Said fitting 12 is made hollow to constitute a conduit 14 through which liquid passes from the receptacle to the faucet proper. It is provided with an intake branch 15 which extends through and may have screw-threaded engagement with the wall of the receptacle 10 and with an outlet branch 16 for communication with the faucet. As herein shown, the branches 15 and 16 of the fitting are offset from each other, the outlet branch 16, from which leads the faucet 11, being located at a level below the intake branch 15 thereof.

17 (Figs. 2 and 3) designates a vent passage which is located at one side of the fitting and communicates with the interior of the fitting through an opening 18 located at a point above the discharge end of the fitting, or the faucet 11. The said opening 18 is shown as located at the level of the lower end of the vent passage. The other end 20 of the vent passage opens to the atmosphere, whereby air may pass to the interior of the fitting and to the tank when liquid is being withdrawn from the receptacle.

When the cock or faucet is open the liquid is free to flow by gravity from the receptacle 10 through the fitting and faucet, and during withdrawal of the liquid air passes through the passage 17 and the fitting into the receptacle to vent the latter. When the faucet is closed, however, the liquid fills the fitting 12 and rises in the inner or lower end of the vent passage 17 to a point above the opening thereof, as indicated in Fig. 2, whereby the vent passage is sealed against the entrance of air therethrough to the fitting and receptacle. When the seal is thus effected no air can pass into the receptacle, and therefore no liquid will pass from the receptacle through the only passage which is at that time open, to-wit, the vent passage 17. Thus it will be seen that the draw-off fitting and receptacle is effectually sealed against the entrance of air at all times when the faucet 11, or an equivalent closure by which the flow of liquid from the receptacle is controlled, is closed. When the faucet 11 or its equivalent is opened to permit the discharge of liquid from the receptacle the liquid will be drawn from the vent passage, thus uncovering the opening 18 and permitting air to pass into the receptacle to vent the same during the withdrawal of the liquid therefrom.

In the form of device shown in Figs. 1 to 3, inclusive, the vent passage 17 extends upwardly from the opening 18 and inwardly toward the wall of the cask, terminating a distance short of the cask at the point 20. The location of the inlet or intake end of the vent passage is not essential to a proper venting of the device, but is advantageous as herein shown inasmuch as its location tends to prevent entrance of dust or foreign matter to the vent passage. The said vent passage may be formed in a part integral with the fitting 12, or it may be formed between said fitting and a separate casing or shell 21, the latter being shown in Figs. 2 and 3.

In Fig. 4 I have shown a fitting 24 made generally similar to the fitting 12 shown in the previously described figures. In this construction the vent passage 25 is shown as formed between the outer wall of the fitting and a sheet metal casing 26 suitably secured to said outer wall of the casing and extending upwardly from the horizontal branch 27 of the fitting to or near the level of the intake branch 28 thereof. The said vent passage 25 communicates with the interior of the fitting through an opening 29 located adjacent to the bottom or inner end wall 30 of said passage. The vent passage communicates, as herein shown, with the atmosphere through a vent opening 31 formed in the sheet metal wall of the passage near the upper end thereof. The said opening 31 may be formed by punching outwardly the metal constituting the shell 26 and the material thus punched out may be arranged to form a lip or projection 32 which overhangs the opening to prevent dirt or other foreign matter falling into the vent passage. The operation of this form of the device is essentially the same as that of the device previously described and such operation need not be repeated here.

In Fig. 5 I have shown another modification in which the fitting 35 is made substantially like that illustrated in the other figures; it comprising an intake branch 36 and an outlet branch 37 located at a level below the intake branch and connected thereto by a transverse portion. The said fitting is provided with a vent passage 38 having an opening 39 near its upper end. The said vent passage instead of communicating with the interior of the fitting and the receptacle through an opening leading directly from the inner or lower end of the vent passage, as in the previously described construction, communicates with the receptacle through the medium of a pipe 40 which extends horizontally outwardly through the intake branch 36 and through the vertical wall of the offset part connecting the intake and outlet branches of the fitting, and is provided at its outer end with a down-turned portion 41 located within the vent passage. The said down-turned portion 41 of the pipe 40 terminates a short distance above the lower end wall 42 of the vent passage. In the operation of this form of the device, when the cock or faucet is open liquid passes freely through the fitting, and air passes through the opening 39, the vent passage 38 and the pipe 40 to the interior of the receptacle to vent the latter. When the faucet is closed, however, liquid passes through the pipe 40 into the vent passage in a sufficient quantity to submerge and seal the lower end of the down-turned portion 41 of said pipe, and thus cuts off entrance of air from the receptacle. As soon as the faucet is again open the withdrawal of liquid from the receptacle permits the air to enter the vent passage and force the liquid, which theretofore sealed the lower end of the down-turned portion 41 of the pipe 40, upwardly through said pipe back into the receptacle, whereupon a vent is established from the exterior of the receptacle to the interior thereof to permit the free out-flow of liquid therefrom as long as the faucet or other liquid controlling device is adjusted to permit the out-flow of liquid.

It will be observed that I have provided an exceedingly simple and efficient device for controlling the inlet of air to a receptacle to vent the same during the out-flow of liquid therefrom, and for automatically sealing the venting means as soon as the out-flow of liquid from the receptacle is arrested. The vent passage is automatically opened by the mere act of opening the liquid controlling valve and such opening of the vent passage and its subsequent sealing after the flow of liquid is arrested are effected without the employment of movable parts. The device is, therefore, free from derangement and the parts are always ready to serve the functions which they are designed to perform.

The arrangement described prevents loss of gas from the receptacle when the liquid therein is charged with gas, the vent passage being sealed from the escape of gas.

While I have herein shown a number of forms of constructions capable of producing the results for which my invention is designed, it will be understood that the invention is not limited to the structural details herein illustrated and suggested except as such details are hereinafter made the subject of specific claims.

I claim as my invention:—

1. A draw-off fitting for hermetically closed liquid receptacles combined with a manually operable device for controlling the flow of liquid therethrough and provided with means for automatically venting the fitting and receptacle when the controlling device is opened, said venting means being adapted to be automatically closed, when the controlling device is closed by a liquid seal supplied with liquid from the receptacle prior to its passage through the fitting.

2. A draw-off fitting for hermetically closed liquid receptacles provided with a liquid discharge passage and combined with means for controlling the flow of liquid through said passage, said fitting being provided with a separate vent passage which opens at one end to the atmosphere and at its other end to the interior of the fitting and receptacle and is arranged to be closed to the atmosphere by a liquid seal when said discharge passage is closed and is adapted to be automatically opened by breaking said seal to admit air to the receptacle when said discharge passage is opened.

3. A draw-off fitting for hermetically closed liquid receptacles combined with a manually operable device for controlling the flow of liquid therethrough and provided with a vent passage that is adapted to be closed by a liquid seal within the fitting, supplied with liquid from the receptacle prior to its passage from the fitting, when the controlling device is closed, said liquid seal being subjected at one side to atmospheric pressure.

4. A draw-off fitting for hermetically closed liquid receptacles combined with means for controlling the flow of liquid therethrough and provided with a vent passage open at one end to the atmosphere and at its other end to the interior of the fitting, said latter opening being arranged to be automatically closed by a liquid seal when the flow of liquid through the fitting is arrested.

5. A draw-off fitting for hermetically closed liquid receptacles having its intake end arranged for connection with a receptacle and having its outlet end below said inlet end and associated with means for controlling the flow of liquid therethrough, said fitting being provided above said outlet end with a vent opening arranged to be automatically closed by a liquid seal when the flow of liquid through the fitting is arrested.

6. A draw-off fitting for hermetically closed liquid receptacles having its intake end arranged for connection with a receptacle and having its outlet end below said inlet end and associated with means for controlling the flow of liquid therethrough, said fitting being provided with a vent passage, one end of which terminates adjacent to the receptacle and the other end of which communicates with the interior of the fitting through an opening located above the outlet end of the fitting and arranged to be closed by a liquid seal when the flow of liquid through the receptacle is arrested.

7. A coupling fitting for connecting a faucet with a liquid receptacle having means for connecting it with a receptacle and with a faucet and provided with a vent passage above the end thereof which connects with the faucet, said vent passage opening to the atmosphere and to the interior of the fitting and being arranged to be closed by a liquid seal.

8. A coupling fitting for connecting a faucet with a liquid receptacle comprising vertically offset intake and outlet ends, the latter designed for connection with a faucet, said fitting being provided with a vent passage which opens at one end to the atmosphere and opens at its other end to the interior of the fitting at a point above the outlet end and arranged to be liquid sealed.

In testimony, that I claim the foregoing as my invention I affix my signature in the presence of two witnesses, this 3rd day of December A. D. 1908.

JOHN L. FATE.

Witnesses:
GEORGE R. WILKINS,
T. H. ALFREDS.